March 15, 1955 F. KOSTER 2,704,124
APPARATUS FOR NOTCHING SLOTS IN THE ENDS OF TUBING
Filed April 22, 1952 2 Sheets-Sheet 1
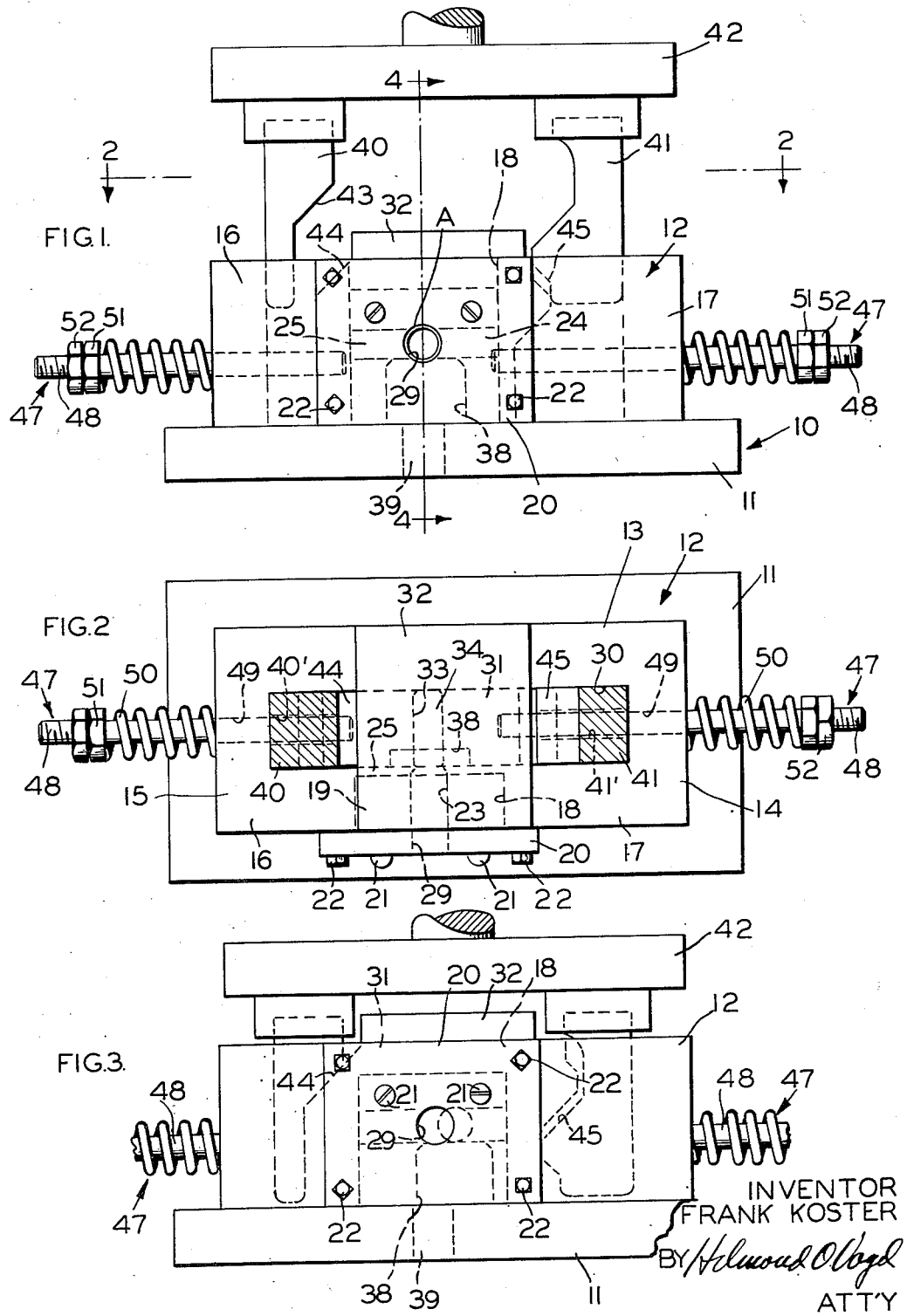
INVENTOR
FRANK KOSTER
BY Helmond O Vogel
ATT'Y March 15, 1955     F. KOSTER     2,704,124
APPARATUS FOR NOTCHING SLOTS IN THE ENDS OF TUBING
Filed April 22, 1952     2 Sheets-Sheet 2

INVENTOR
FRANK KOSTER
BY Hilmond O. Vogel
ATT'Y

United States Patent Office 2,704,124
Patented Mar. 15, 1955

2,704,124

APPARATUS FOR NOTCHING SLOTS IN THE ENDS OF TUBING

Frank Koster, Melrose Park, Ill., assignor to Vogel Tool & Die Corporation, a corporation of Illinois Application April 22, 1952, Serial No. 283,588

3 Claims. (Cl. 164—50)

This invention relates to an improvement in preparing tubing ends. More particularly this invention relates to an improved apparatus for notching out wall sections from the ends of tubular members.

In the preparation and construction of tubular joints by welding or brazing, one tube is joined to the outer periphery of a second tube. In order to secure proper joining of the tubes, one of the tubes must have its end prepared in a manner to fit the contour of the second tube. This is accomplished by removing oppositely disposed sections from the end of the tube leaving a pair of aligned oppositely disposed notches or recesses which match the contour of the tube to which it is welded. Numerous methods have been used to prepare the ends of the tube, such as grinding, burning or sawing. These have been found to be unsatisfactory from the standpoint of production and quality. An improvement which placed the preparation of tube ends on a satisfactory basis was disclosed and covered in the Vogel Patent, No. 2,126,519, patented August 9, 1938. This patent discloses an apparatus for notching out ends of tubing by the insertion of a punch or cutter into the ends of a tube, moving the punch into shearing engagement with a die block thereby notching out one side of the tube, rotating the tube a full 180 degrees and then notching out an opposite side. This unit operates in a satisfactory manner but in the interests of efficiency and production applicant has devised an improved apparatus designed to lower the time required to perform this operation. It is a prime improvement of this invention therefore to provide an improved apparatus for notching tube ends, the apparatus including a mechanism whereby opposite ends of the tube are notched in a single production operation.

Another object is to provide an apparatus for notching opposed arcuate sections from the ends of tubing, said apparatus including a base on which a die block is mounted, the die block including an opening or bore for receiving the tubing to be cut, the bore also supporting a movable punch holder having a cutter with oppositely disposed cutting edges, the cutter and punch holder being movable in a reciprocating manner to engage cutter edges on the die block for notching out oppositely aligned arcuate sections from the ends of the tube.

Still another object is to provide an apparatus for notching arcuate sections from tube ends, the apparatus including a ram movable toward and away from a supporting base, the base supporting a die block having a bore extending therethrough, said bore on one face of said block being joined by opposed recesses which, with said bore, form oppositely disposed cutting edges, the base also supporting a punch holder for reciprocation, the punch holder including a cutter having diametrically opposed cutting edges which are insertable into a tube for cutting out opposed sections, the punch holder including camming edges which are engageable by a pair of cams supported on the ram during the downward travel of the ram for reciprocating the punch holder whereby the cutting edges of the cutter and the die block are effective to notch out oppositely disposed sections from the ends of the tube, said operation taking place during one downward movement of the ram with respect to the base.

A more specific object is to provide an improved apparatus for notching out arcuate sections from the end of a tube, the apparatus including a punch which is relatively movable with respect to a die in a reciprocating manner, the punch being movable in a first direction to notch out one arcuate section, the punch then being movable in an opposite direction for notching out a second arcuate section, the movement of said punch being occasioned by means of a ram having cams connected thereto, the cams being engageable with the punch during downward travel of the ram for reciprocating said punch through its complete cutting cycle during one travel of the ram.

These and further objects will become more apparent from a reading of the specification when taken in connection with the accompanying sheets of drawings.

In the drawings:

Figure 1 is a side elevational view of an apparatus for notching out segments from the end of tubing;

Figure 2 is a sectional view taken along the line 2—2 of Figure 1;

Figure 3 is an elevational view of the apparatus shown in Figure 1 with the apparatus in a closed operating position;

Figure 4:
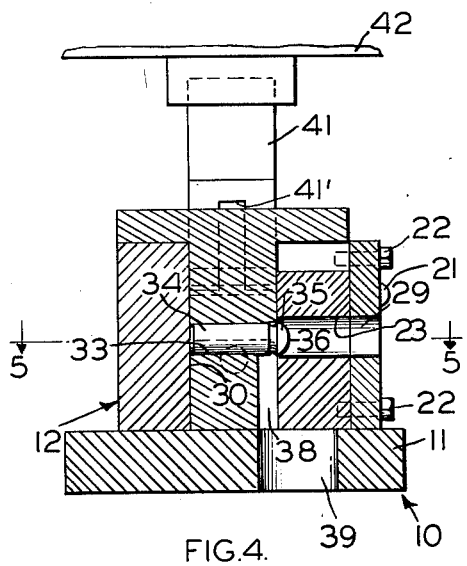
Figure 4 is a sectional view taken along the line 4—4 of Figure 1.

Referring now particularly to Figures 1 through 7, a tube notching apparatus is generally designated by the reference character 10. The apparatus 10 comprises a supporting base 11 which may in turn be seated on the platen of a power press (not shown). The base 11 has supported thereon a guide element generally indicated at 12. The guide element 12 includes a rear wall 13, side walls 14 and 15, and front walls 16 and 17. The front walls 16 and 17 are transversely spaced with respect to each other to provide a space 18 in which a removable die block 19 is positioned. The die block 19 is suitably held in assembly within the space 18 by means of a face plate 20 which is connected by means of screws 21 to the die block 19. The face plate 20 in turn is connected to the front walls 16 and 17 by means of screws 22.

Figures 6, 10:
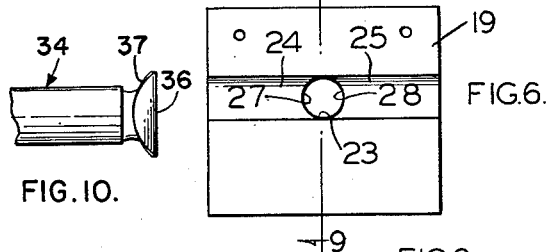
Figure 6 is a detail view, in elevation, of a die block.
Figure 10 is an enlarged side-elevational view of a portion of shearing punch.

The die block 19 as best shown in Figure 6 is provided with a bore 23 extending therethrough. The bore 23 on the inner face of the die block 19 is in communication with a pair of arcuate recesses 24 and 25 which form at the junction of the recesses 24 and 25 with the bore 26 opposed arcuate cutting and shearing edges 27 and 28. The bore 23 is also positioned in alignment with an opening 29 formed in the plate 20.

The guide element 12 is provided with a recess 30 in which a punch holder 31 is reciprocally positioned. The punch holder 31 is provided at its upper end with a projecting guide plate 32 which is seated upon the upper surfaces of the walls 13, 16 and 17. The punch holder 31 includes a bore 33 which supports a punch 34. The punch 34 includes a cutting head 35 having an arcuate face 36 and oppositely disposed cutting edges 37, also of arcuate shape. The arcuate face 36 conforms to the shape of the recesses 24 and 25 and the cutting edges 37 are adapted to engage the cutting edges 27 and 28 in shearing relation.

The punch holder 31 is provided with a recess or slot 38 to provide for the discharge of slugs through an opening 39 in the base 11. Reciprocation of the punch holder 31 in the recess 30 is effected by means of cams 40 and 41. The cams 40 and 41 are suitably supported from a ram 42 which is movable in a conventional manner by means of a power press (not shown) toward and away from the base 11. The cam 40 includes an engaging surface 43 which is adapted to engage a cam face 44 on the punch holder 31, to move the punch holder 31 in a direction to the right. The cam 41 is provided with a cam face 45 which is adapted to engage a cam face 46 on the punch holder 31 for moving the punch holder 31 to the left.

Figure 5:
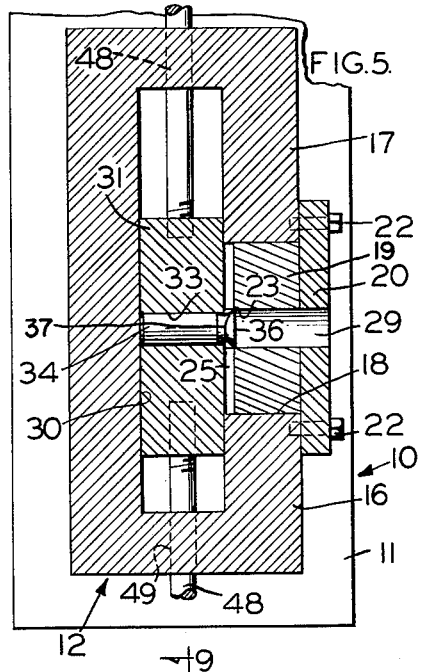
Figure 5 is a cross sectional view taken along the line 5—5 of Figure 4.
Figure 9:
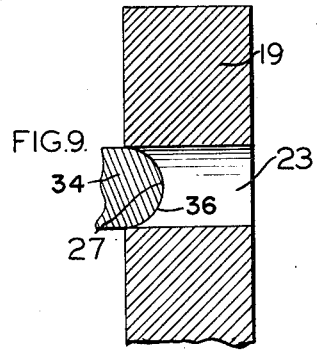
Figure 9 is a detail sectional view taken along the line 9—9 of Figure 6.
Figure 7:
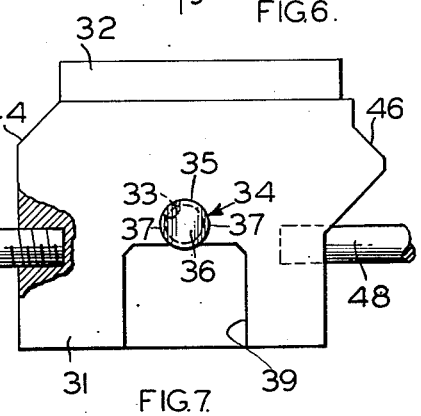
Figure 7 is a detail view in elevation of a punch and punch holder.

After the apparatus 10 has accomplished a complete cycle of operation and the ram 42 has returned to the position shown in Figure 1, the punch holder 31 is returned to its original position by means of spring devices 47. Each spring device 47 includes a threaded pin 48 which as best shown in Figures 5 and 7 are connected to the punch holder 31. The pins 48 extend through bores 49 in the walls 16 and 17. Springs 50 are supported by the pins 48 and maintained under tension by adjusting and locking nuts 51 and 52. Each cam 40 and 41 is provided with a recess 40' and 41' so that the cams 40 and 41 straddle the pins 48.

The operation

In the operation the apparatus 10 is placed in a power press (not shown) in the position indicated in Figure 1. A tube to be notched (A) is inserted into the bore 23 and the end of the tube is pushed over the cutting head 35. The power press is now actuated to push the ram 42 downwardly whereupon the cam 41 has the cam face 45 engage the cam 46 of the punch holder 31 to push the punch holder to the left. The cutting edge 37 cuts into the end of the tube and in cooperation with shearing edge 28 notches out one side of the tube. Continued travel of the ram in a downward direction now brings the cam surface 43 into engagement with the cam face 44 pushing the punch holder to the right whereupon the edge 37 of the cutting head 35 has sheared the end of the tube in cooperation with the cutting edge 27 of the die block 19. This shearing operation is well shown in Figure 3 where the punch holder has moved to the extreme right hand position.

Thus in one downward travel of the ram 42, both sides of the tube have been arcuately notched and the tube is now ready for processing in the formation of tubular joints.

The arcuate segments which are cut from the end of the tube can be discharged through the recess 38 and the opening 39. Upon the upward travel of the ram 42 and the cams 40 and 41, the spring devices 47 serve to center the punch holder in the position indicated in Figures 1 and 2 for the succeeding operation.

Figure 8:
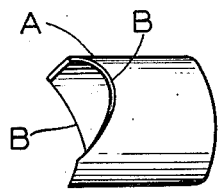
Figure 8 is a detail view of a section of tubing having oppositely disposed arcuate notches prepared in the end of the tube.
Figure 11:
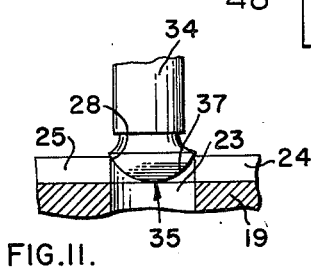
Figure 11 is an enlarged plan view, partially in section, showing the cooperation of a shearing punch with a die block.

It now can be seen that the ends of the tube can be prepared in one stroke of the apparatus to effect the cutting out of the arcuate segments B of the tube A as indicated in Figure 8. Thus only one operation of the unit is required and high and efficient production results.

It must be understood that changes and modifications may be made without departing from the spirit of the invention as disclosed, nor the scope thereof as defined in the appended claims.

What is claimed is:

1. An apparatus for notching out oppositely disposed sections from the wall ends of tubing comprising, a supporting base, a pair of transversely spaced guide members supported on said base, a die block supported on said base, said die block having a tube supporting opening extending transversely with respect to said guide members, oppositely disposed shearing portions on said die block adjacent said opening, a punch holder supported for horizontal reciprocating movement between said guide members, said holder including a punch having oppositely disposed shearing edges adapted to project into the end of a tube and to cooperate with the shearing portions in shearing relation, means for reciprocating said punch holder whereby oppositely disposed portions are successively cut from the end of a tube, comprising a first cam face on said punch holder, a second cam face on said punch holder, first and second cams, the first cam being spaced relatively closer to said first cam face than the spacing of said second cam relative to said second cam face and a vertically movable ram connecting both cams, said ram being vertically movable for moving said first and second cams respectively and successively into engagement with said cam faces during one vertical stroke of said ram whereby said punch holder is reciprocated relative to said die block.

2. An apparatus in accordance with claim 1 including resilient members supported on said base on opposite sides of said punch holder, said resilient members being engageable with said punch holder for urging the same to its original position upon disengagement of said cams from said cam faces.

3. An apparatus for notching out oppositely disposed arcuate sections from the wall ends of tubing comprising, a supporting base, a pair of transversely spaced guide members supported on said base, a die block supported on said base, said die block having an opening adapted to support and encircle a tube, said opening being in communication with the space formed by said spaced guide members, a pair of arcuately shaped recesses formed in said die block in connecting relation with respect to said opening to provide oppositely disposed arcuate shearing edges, said recesses extending oppositely with respect to each other, a punch holder positioned between said guide members for horizontal reciprocating movement, a punch supported on said punch holder, said punch including a cutter projecting outwardly from the punch holder, an arcuate face on said cutter, said face conforming to the arcuate recesses of said die block, oppositely disposed arcuate cutting edges on said cutter for cooperating in shearing relation with the shearing edges of said die block, said cutter being adapted to project into the end of a tube in mating relation, means for reciprocating said punch holder in said recesses, said means comprising a first cam face on said punch holder, a first cam engageable with said first cam face for moving said punch holder in a first lateral direction with respect to said die block, a second cam face on said punch holder, a second cam for moving said punch holder in an opposite direction, said first cam being spaced relatively closer to said first cam face than the spacing of said second cam with respect to said second cam face whereby oppositely disposed arcuate portions are cut from said tube during reciprocation of said punch holder, and a vertically disposed ram connecting both cams for moving said cams simultaneously during one vertical stroke of said ram.

References Cited in the file of this patent

UNITED STATES PATENTS

| 1,717,612 | McNeil | June 18, 1929 |
| 1,866,360 | Kranz | July 5, 1932 |
| 2,224,708 | Van Sittert | Dec. 10, 1940 |
| 2,297,013 | Nichols et al. | Sept. 29, 1942 |